United States Patent
Cheng et al.

(10) Patent No.: US 11,586,058 B1
(45) Date of Patent: Feb. 21, 2023

(54) CONTINUOUSLY ELECTRONICALLY CONTROLLED LINEAR POLARIZATION ROTATOR

(71) Applicant: National Central University, Taoyuan (TW)

(72) Inventors: Ko-Ting Cheng, Chiayi (TW); Yi-Xuan Liu, Yilan County (TW); Chi-Tang Huang, Changhua County (TW); Cheng-Kai Liu, Hsinchu County (TW)

(73) Assignee: NATIONAL CENTRAL UNIVERSITY, Taoyuan (TW)

( * ) Notice: Subject to any disclaimer, the term of this patent is extended or adjusted under 35 U.S.C. 154(b) by 0 days.

(21) Appl. No.: 17/718,773

(22) Filed: Apr. 12, 2022

(51) Int. Cl.
| | |
|---|---|
| *G02F 1/1337* | (2006.01) |
| *G02F 1/1335* | (2006.01) |
| *G02F 1/01* | (2006.01) |
| *G02F 1/1347* | (2006.01) |
| *G02F 1/139* | (2006.01) |
| *G02F 1/1341* | (2006.01) |

(52) U.S. Cl.
CPC .......... *G02F 1/0136* (2013.01); *G02F 1/1341* (2013.01); *G02F 1/1393* (2013.01); *G02F 1/13471* (2013.01); *G02F 1/133738* (2021.01)

(58) Field of Classification Search
CPC ............. G02F 1/1335; G02F 1/133528; G02F 1/133531; G02F 1/1337; G02F 1/133757; G02F 1/133738; G02F 1/0136; G02F 1/1341; G02F 1/13471; G02F 1/1393
See application file for complete search history.

(56) References Cited

U.S. PATENT DOCUMENTS 5,642,214 A * 6/1997 Ishii .................... G02F 1/13473
349/96

* cited by examiner

*Primary Examiner* — Thoi V Duong
(74) *Attorney, Agent, or Firm* — Guice Patents PLLC

(57) ABSTRACT

A continuously electronically controlled linear polarization rotator includes a first liquid crystal cell having a first upper substrate, a first lower substrate, and a transparent liquid crystal layer disposed between the first upper substrate and the first lower substrate; and a second liquid crystal cell having a second upper substrate, a second lower substrate, and a transparent liquid crystal layer disposed between the second upper substrate and second lower substrate. The first and second liquid crystal cells satisfy a condition that $d\Delta n/\lambda$ is in a range of 1.2 to 1.8, wherein $\lambda$ is a wavelength of incident light traveling through the first and second liquid crystal cells, d is thickness of the transparent liquid crystal layer, $\Delta n$ is birefringence of the transparent liquid crystal layer. The first and second liquid crystal cells are applied by voltage to make a linear polarization angle of outgoing light continuously rotate.

3 Claims, 11 Drawing Sheets

Diagram showing the operation of the continuously electronically controlled linear polarization rotator Diagram showing the result of the experiment conducted with a continuously changed voltage and an included angel $\beta = 0°$ Diagram showing the result of the experiment conducted with a continuously changed voltage and an included angel $\beta = 22.5°$ Diagram showing the result of the experiment conducted with a continuously changed voltage and an included angel $\beta = 45°$ Diagram showing the result of the experiment conducted with a continuously changed voltage and an included angel $\beta = 67.5°$ Diagram showing the operation of the continuously electronically controlled linear polarization rotator Diagram showing the operation of the continuously electronically controlled linear polarization rotator

US 11,586,058 B1

CONTINUOUSLY ELECTRONICALLY CONTROLLED LINEAR POLARIZATION ROTATOR

BACKGROUND OF THE INVENTION

1. Field of the Invention

The present invention is related to a technical field of a linear polarization rotator, and more particularly to a continuously electronically controlled linear polarization rotator capable of continuously rotating a linear polarization angle of outgoing light, to achieve better linear polarization effect.

2. Description of the Related Art

The polarization rotator made of liquid crystal material has been widely used in the market, and related products have been released in the industry.

An external parallel electric field can be applied on a substrate to control a linear polarization direction of outgoing light, to make an electronically controlled linear polarization rotator, for example, according to lines 3 to 5 in page 13 in specification of China Patent No. CN100437266, when an electric field of a voltage with a value greater than a predetermined value is applied on a liquid crystal layer, the liquid crystal layer is twisted by 90°. Thus, in this embodiment, the polarization rotator operates when being applied by an electric field, and the polarization rotator does not operate when not being applied by an electric field. However, till the present time, the manner of electronically controlling the nematic liquid crystal to twist can only switch a polarization rotation angle of outgoing light between two statuses on and off, and the change in the polarization rotation angle has no continuity. Furthermore, the conventional continuous polarization rotator can work only when the included angle between the linear polarization direction of incident light and the first liquid crystal layer is fixed at 0° or 90°.

SUMMARY OF THE INVENTION

An objective of the present invention is to disclose a continuously electronically controlled linear polarization rotator which is formed by two twisted nematic liquid crystal cells, and the liquid crystal cells are applied by a voltage exceeding a specific voltage value, the continuously electronically controlled linear polarization rotator is able to continuously rotate a linear polarization angle of outgoing light and have better linear polarization degree.

In order to achieve the above-mentioned objective and effect, the present invention provides a first embodiment of a continuously electronically controlled linear polarization rotator including a first liquid crystal cell and a second liquid crystal cell.

The first liquid crystal cell includes a first upper substrate and a first lower substrate which are treated to have horizontal alignment directions perpendicular orthogonal to each other, and the first liquid crystal cell is filled with a transparent liquid crystal layer located between the first upper substrate and the first lower substrate.

The second liquid crystal cell includes a second upper substrate and a second lower substrate, wherein horizontal alignment directions of the second upper substrate and the second lower substrate are perpendicular orthogonal to each other, and the second liquid crystal cell is filled with a transparent liquid crystal layer located between the second upper substrate and the second lower substrate.

The first liquid crystal cell and the second liquid crystal cell satisfy a condition that $d\Delta n/\lambda$ is in a range of 1.2 to 1.8, wherein $\lambda$ is wavelength of incident light traveling through the first liquid crystal cell and the second liquid crystal cell, d is a thickness of the transparent liquid crystal layer, $\Delta n$ is birefringence of the transparent liquid crystal layer, the first lower substrate of the first liquid crystal cell is arranged correspondingly to the second upper substrate of the second liquid crystal cell, and an alignment direction of the first lower substrate of the first liquid crystal cell is perpendicular orthogonal to a second alignment direction of the second upper substrate of the second liquid crystal cell, wherein the first liquid crystal cell and the second liquid crystal cell are applied by voltages to change a linear polarization direction of outgoing light traveling through the first liquid crystal cell and the second liquid crystal cell.

In order to achieve the above-mentioned objective and effect, the present invention provides a second embodiment of a continuously electronically controlled linear polarization rotator including a first liquid crystal cell.

The first liquid crystal cell includes a first upper substrate and a first lower substrate, wherein the first upper substrate and the first lower substrate are treated to have horizontal alignment directions perpendicular orthogonal to each other, and the first liquid crystal cell is filled with a transparent liquid crystal layer located between the first upper substrate and the first lower substrate.

The first liquid crystal cell satisfies a condition that $d\Delta n/\lambda$ is in a range of 1.2 to 1.8, wherein $\lambda$ is wavelength of incident light traveling through the first liquid crystal cell, d is a thickness of the transparent liquid crystal layer, $\Delta n$ is birefringence of the transparent liquid crystal layer, wherein the first liquid crystal cell is applied by voltage to change a linear polarization direction of an outgoing light traveling through the first liquid crystal cell.

BRIEF DESCRIPTION OF THE DRAWINGS

The structure, operating principle and effects of the present invention will be described in detail by way of various embodiments which are illustrated in the accompanying drawings.

DETAILED DESCRIPTION OF THE PREFERRED EMBODIMENTS

Figure 1:
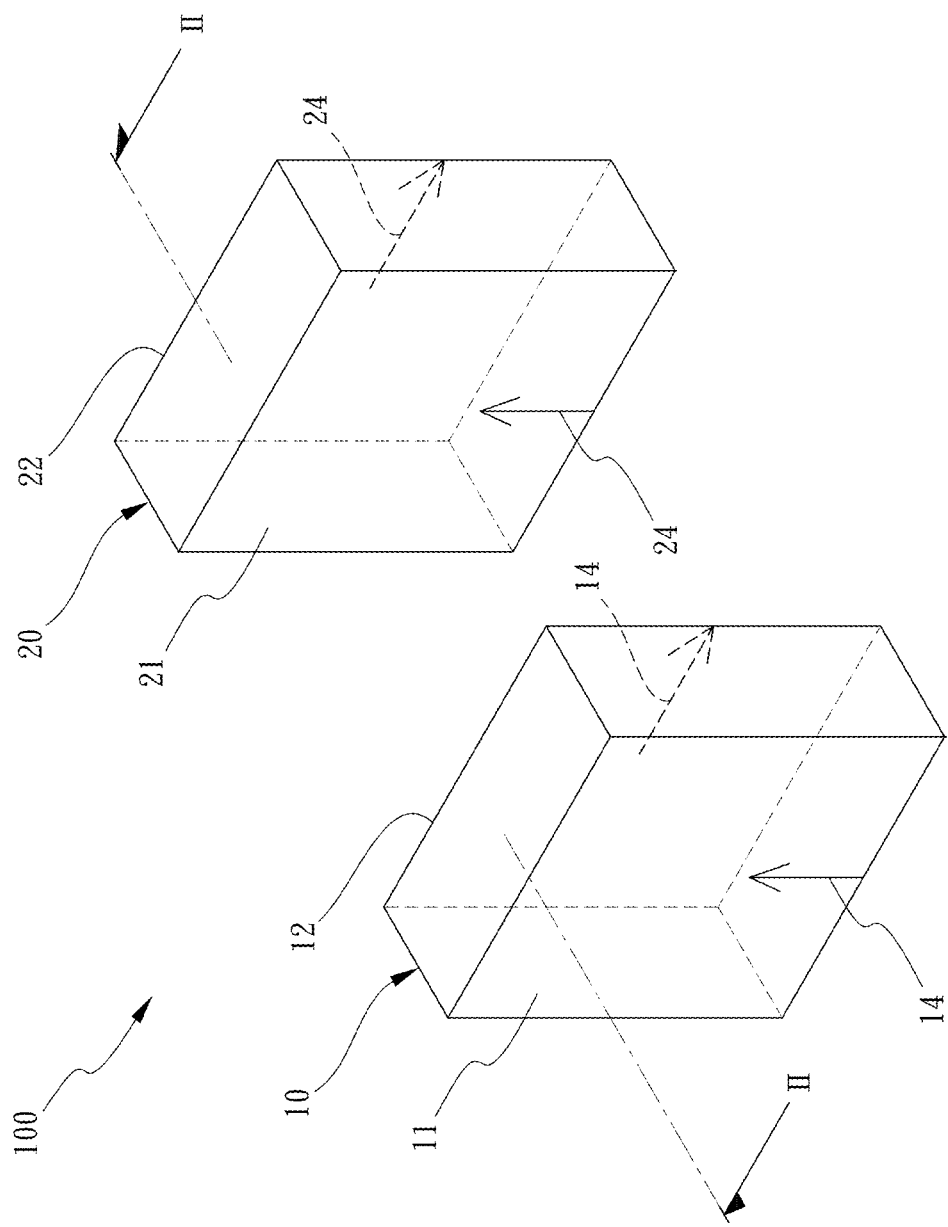
FIG. 1 is a perspective view of a first liquid crystal cell and a second liquid crystal cell, according to the present invention.

The following embodiments of the present invention are herein described in detail with reference to the accompanying drawings. These drawings show specific examples of the embodiments of the present invention. These embodiments are provided so that this disclosure will be thorough and complete, and will fully convey the scope of the invention to those skilled in the art. It is to be acknowledged that these embodiments are exemplary implementations and are not to be construed as limiting the scope of the present invention in any way. Further modifications to the disclosed embodiments, as well as other embodiments, are also included within the scope of the appended claims.

These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts. As used herein, the singular forms "a", "an" and "the" are intended to include the plural forms as well, unless the context clearly indicates otherwise.

It is to be acknowledged that, although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present disclosure. As used herein, the term "or" includes any and all combinations of one or more of the associated listed items.

It will be acknowledged that when an element or layer is referred to as being "on," "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present.

In addition, unless explicitly described to the contrary, the words "comprise" and "include", and variations such as "comprises", "comprising", "includes", or "including", will be acknowledged to imply the inclusion of stated elements but not the exclusion of any other elements.

Please refer to FIGS. 1 to 8, which shows a continuously electronically controlled linear polarization rotator of the present invention. A first embodiment of the rotator 100 includes a first liquid crystal cell 10 and a second liquid crystal cell 20.

The first liquid crystal cell 10 includes a first upper substrate 11 and a first lower substrate 12 which are treated to have horizontal alignment directions perpendicular orthogonal to each other. The alignment directions 14 of the first upper substrate 11 and the first lower substrate 12 are perpendicular to each other, and the first liquid crystal cell 10 is filled with a transparent liquid crystal layer 13 located between the first upper substrate 11 and the first lower substrate 12. The second liquid crystal cell 20 includes a second upper substrate 21 and a second lower substrate 22 which are treated to have horizontal alignment directions perpendicular orthogonal to each other. The second alignment directions 24 of the second upper substrate 21 and the second lower substrate 22 are perpendicular to each other, and the liquid crystal cell 20 is filled with a transparent liquid crystal layer 23 located between the second upper substrate 21 and the second lower substrate 22.

The first liquid crystal cell 10 and the second liquid crystal cell 20 satisfy a condition that $d\Delta n/\lambda$ is in a range of 1.2 to 1.8, wherein $\lambda$ is a wavelength of incident light B traveling through the first liquid crystal cell 10 and the second liquid crystal cell 20, d is a thickness of each of the transparent liquid crystal layers 13 and 23, $\Delta n$ is birefringence of each of the transparent liquid crystal layers 13 and 23. The first lower substrate 12 of the first liquid crystal cell 10 is arranged correspondingly to the second upper substrate 21 of the second liquid crystal cell 20, and the alignment direction 14 of the first lower substrate 12 of the first liquid crystal cell 10 is perpendicular orthogonal to the second alignment direction 24 of the second upper substrate 21 of the second liquid crystal cell 20. A voltage can be applied on the first liquid crystal cell 10 and the second liquid crystal cell 20 to change a linear polarization direction of outgoing light C traveling through the first liquid crystal cell 10 and the second liquid crystal cell 20.

Following the above description, the embodiment and effect of the present invention will be described in detail. The first lower substrate 12 of the first liquid crystal cell 10 is arranged correspondingly to the second upper substrate 21 of the second liquid crystal cell 20, and the first liquid crystal cell 10 and the second liquid crystal cell 20 satisfy a condition that $d\Delta n/\lambda$ is in a range of 1.2 to 1.8. When the first liquid crystal cell 10 and the second liquid crystal cell 20 are applied by the same voltages, the birefringence of each of the transparent liquid crystal layer 13 and 23 can be changed by an electronically controlling manner, so that after the incident light B travels through the first liquid crystal cell 10 and the second liquid crystal cell 20, the outgoing light C has a rotational change of linear polarization.

Figure 3:
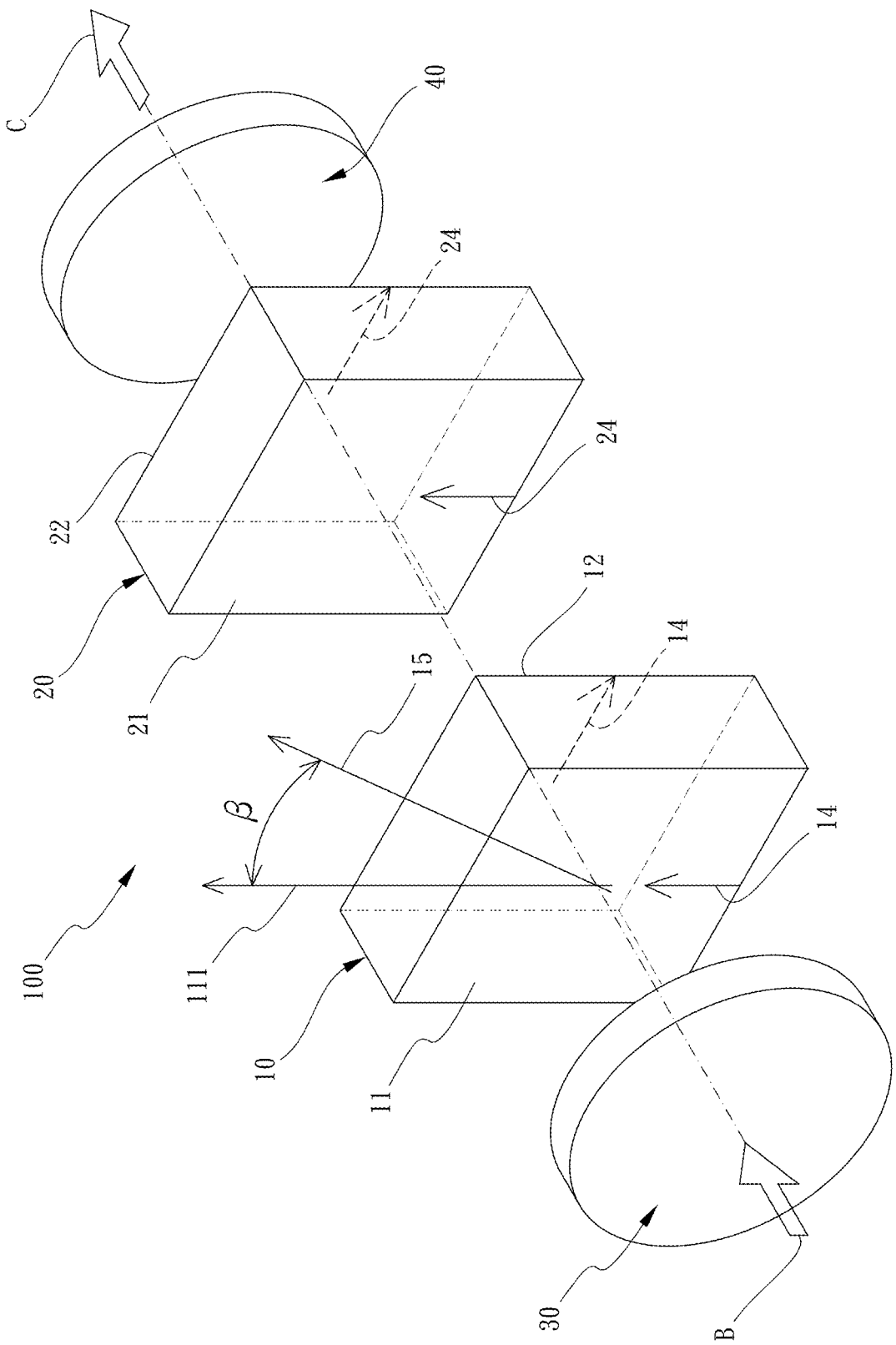
FIG. 3 is a perspective exploded view of a polarizer disposed in front of a first liquid crystal cell and an analyzer disposed behind a second liquid crystal cell, according to the present invention.

As shown in FIG. 3, the first liquid crystal cell 10 and the second liquid crystal cell 20 are arranged in tandem, a polarizer 30 can be disposed in front of the first liquid crystal cell 10, and an analyzer 40 can be disposed behind the second liquid crystal cell 20. Four experiments are conducted with different included angles β=0°, β=22.5°, β=45° and β=67.5°, wherein β is an included angle between the director axis direction 111 of liquid crystal close to the first upper substrate 11 and the polarization direction 15 of the incident light B; the analyzer 40 receives the outgoing light C traveling through the first liquid crystal cell 10 and the second liquid crystal cell 20. FIGS. 4 to 7 shows diagrams of results of the four experiments conducted with different included angles β.

Figure 4:
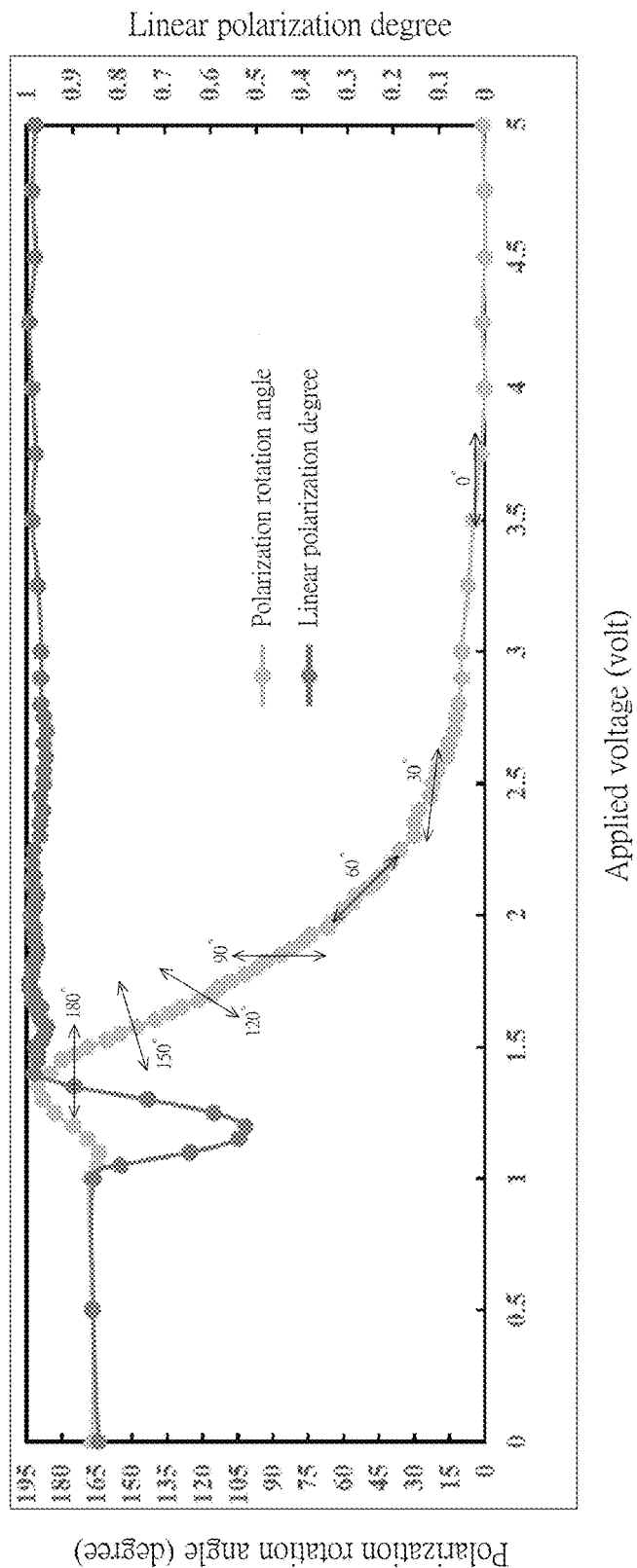
FIG. 4 is a diagram showing a result of an experiment conducted with a continuously changed voltage and an included angel $\beta=0°$, to make a polarization angle of outgoing light continuously change from 180° to 0°, according to the present invention.

FIG. 4 shows the result of the experiment conducted with β=0°. As shown in FIG. 4, the horizontal axis is the applied voltage in volts, the left longitudinal axis is a polarization rotation angle, the right longitudinal axis is the linear polarization degree, the linear polarization degree of the outgoing light C received by the analyzer is marked by dark dotted line, and the linear polarization rotation angle of the outgoing light C received by the analyzer is marked by light dotted line. When the applied voltage is increased from 1 volt to 4 volts, the linear polarization rotation angle of the outgoing light C is 180° when the applied voltage is between 1 volt to 1.5 volts, as shown in bi-directional arrow of FIG. 4; when the applied voltage is increased to 2 volts from 1.5 volts, the linear polarization rotation angle of the outgoing light C is rapidly decreased, such the bi-directional arrow shown in FIG. 4, the linear polarization rotation angle drops from 150° down to 120°, and then to 90°; when the applied voltage is gradually increased to 3 volts from 2 volts, the linear polarization rotation of the outgoing light C has a gentle decrease, such as the bi-directional arrow shown in FIG. 4, the linear polarization rotation angle is decreased to 60° first, and then decreased to 30°; when the applied voltage is gradually increased to 4 volts from 3 volts, the linear polarization rotation angle of the outgoing light C has a gentle decrease to 0°.

Figure 5:
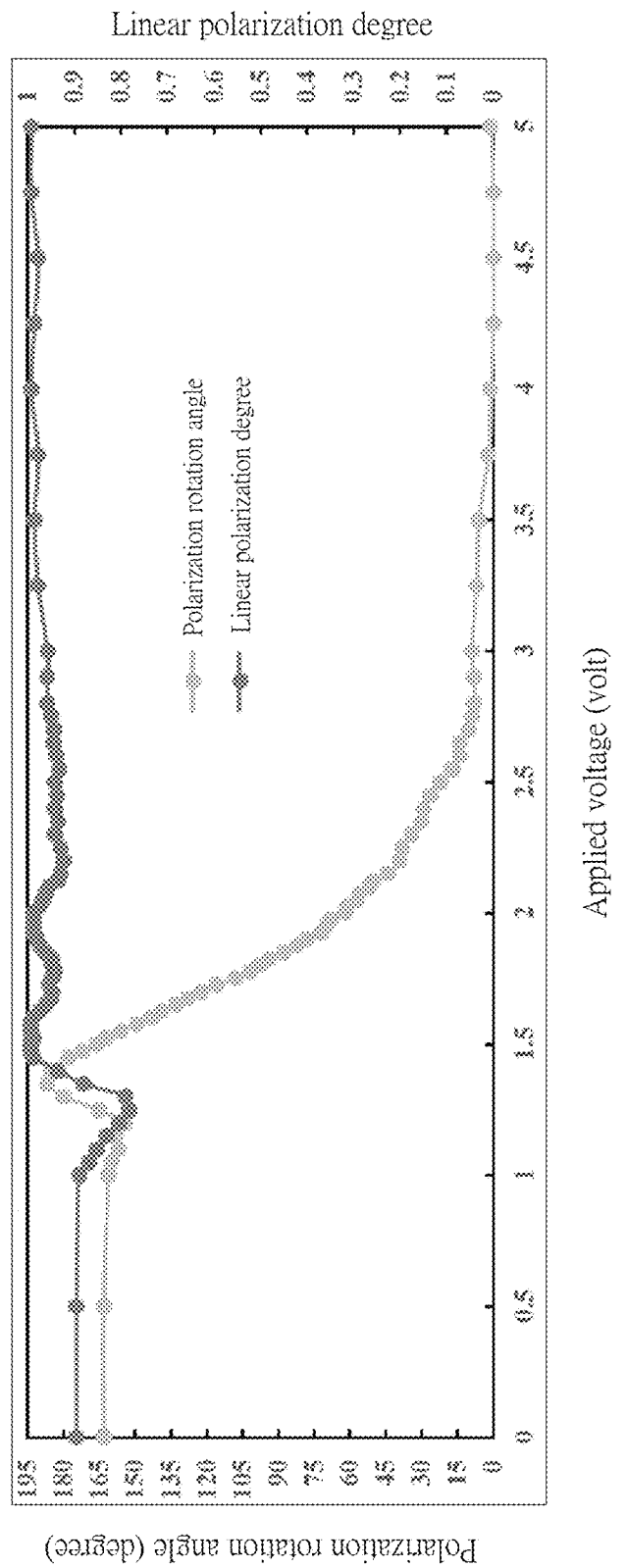
FIG. 5 is a diagram showing a result of an experiment conducted with a continuously changed voltage and an included angel $\beta=22.5°$, to make a polarization angle of outgoing light continuously change from 180° to 0°, according to the present invention.
Figure 6:
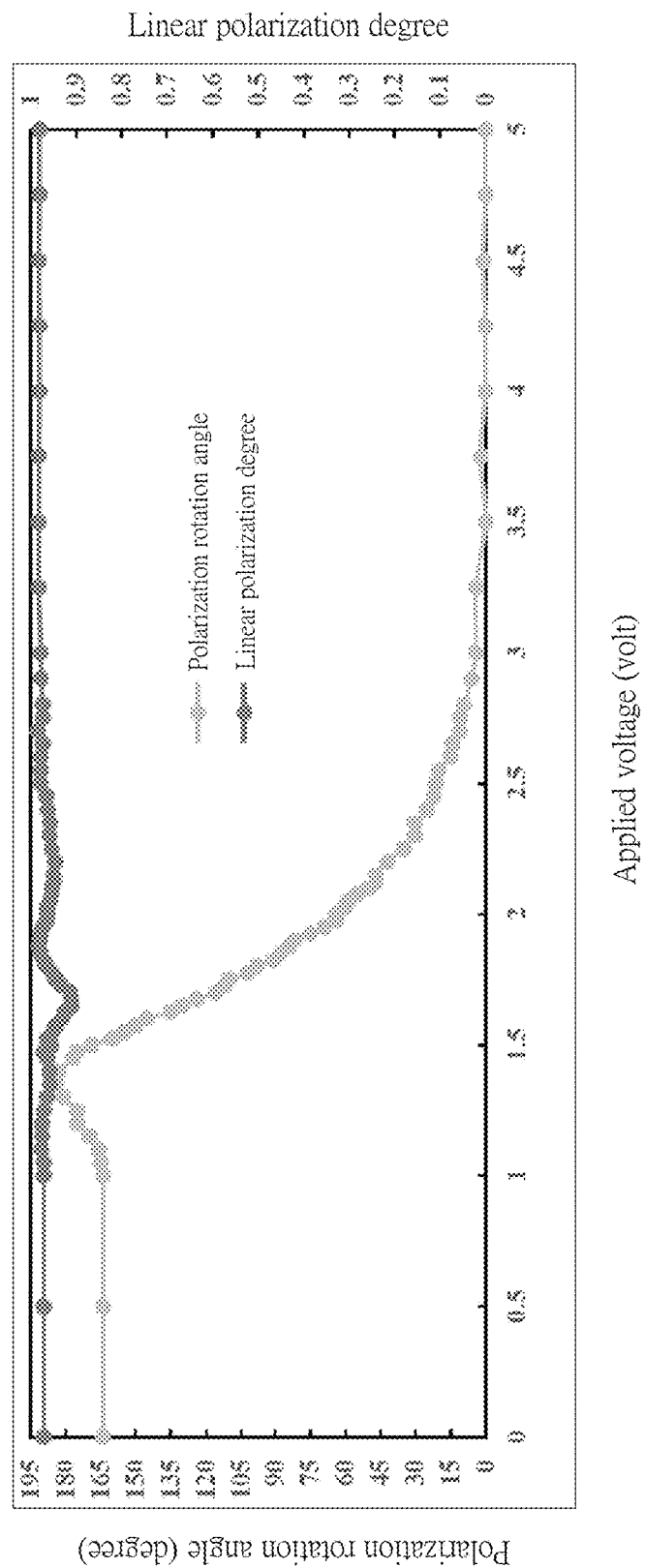
FIG. 6 is a diagram showing a result of an experiment conducted with a continuously changed voltage and an included angel β=45°, to make a polarization angle of outgoing light continuously change from 180° to 0°, according to the present invention.
Figure 7:
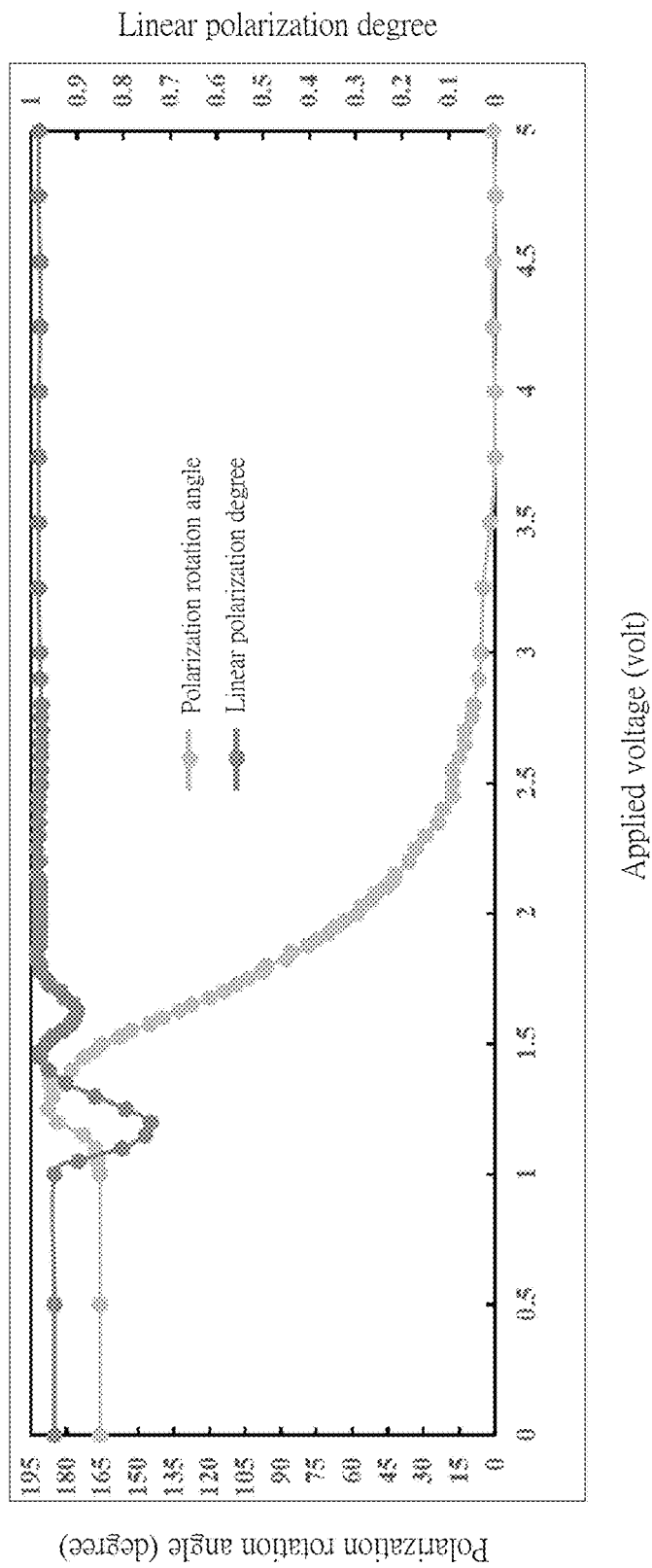
FIG. 7 is a diagram showing a result of an experiment conducted with a continuously changed voltage and an included angel β=67.5°, to make a polarization angle of outgoing light continuously change from 180° to 0°, according to the present invention.

FIGS. 5 to 7 shows the results of the experiments conducted with β=22.5°, β=45° and β=67.5°, respectively. As shown in FIGS. 5 to 7, the light dotted line shows the change trend in linear polarization rotation angle of the outgoing light C, when the applied voltage is gradually increased to 4 volts from 1 volt, the linear polarization rotation angle of the outgoing light C has a change from 180° to 0°.

Figure 8:
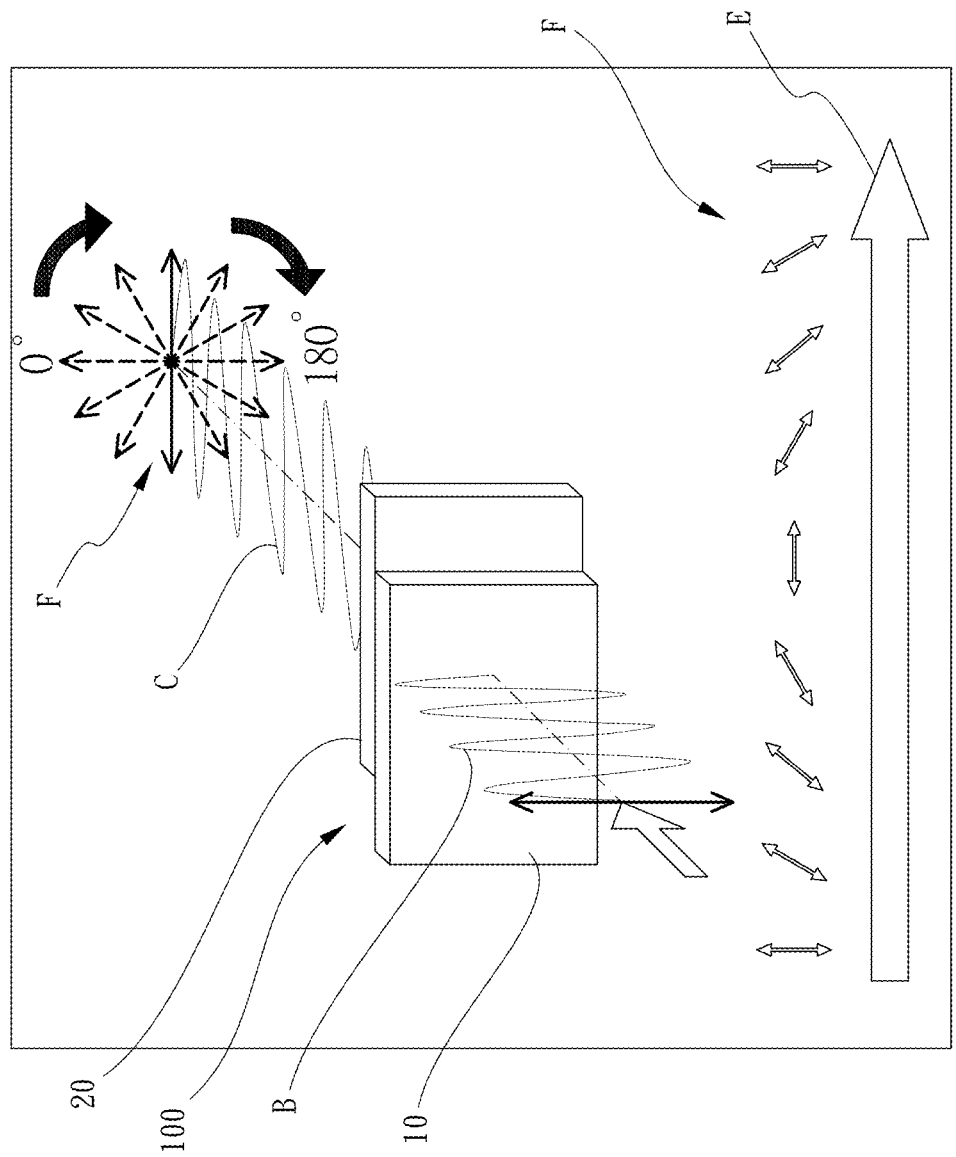
FIG. 8 is a schematic view of an operation of a continuously electronically controlled linear polarization rotator of the present invention.

According to the above-mentioned experiment results, the technical solution of the present invention is able to achieve the electronically controlling manner of changing birefringence of each of the transparent liquid crystal layers 13 and 23 by continuously applying and the same voltages on the first liquid crystal cell 10 and the second liquid crystal cell 20 and changing the applied voltages to make the linear polarization angle of the outgoing light C traveling through the first liquid crystal cell 10 and the second liquid crystal cell 20 continuously change from 180° to 0°. Please refer to FIG. 8, which shows a schematic view of an operation of the continuously electronically controlled linear polarization rotator of the present invention. As shown in FIG. 8, the incident light B travels through the first liquid crystal cell 10 and the second liquid crystal cell 20 to form the outgoing light C which is magnified along the arrow direction in FIG. 8 in response to the change of the voltage E applied on the first liquid crystal cell 10 and the second liquid crystal cell 20, so that the linear polarization rotation angle F of the outgoing light C can be continuously changed from 0° to 180°.

Therefore, compared to the conventional electronically controlled twisted nematic liquid crystal, which only can switch the linear polarization rotation angle between two statuses on/off with no continuity, the first liquid crystal cell 10 and the second liquid crystal cell 20 of the present invention satisfy the condition that dΔn/λ is in a range of 1.2 to 1.8, the alignment direction 14 of the first lower substrate 12 of the first liquid crystal cell 10 is perpendicular orthogonal to the second alignment direction 24 of the second upper substrate 21 of the second liquid crystal cell 20, so that the alignment direction arrangement enables the outgoing light C traveling through the first liquid crystal cell 10 and the second liquid crystal cell 20 to have a continuous change in the linear polarization angle from 180° to 0°. As a result, the present invention has non-obviousness.

When the rotator of the present invention is performed in a pixel unit, the linear polarization directions at different spatial positions can be freely controlled, so the present invention can be applied to the polarization-only spatial light modulator. Compared to the commercially available spatial light modulator which is applied to adjust the light phases at different spatial positions, the present invention is able to improve the spatial light modulator to have spatial linear polarization angle modulation function.

In addition, the low-voltage operation of the present invention can be integrated with the TFTLCD to use, and it does not need to consider the limit in the linear polarization direction of the incident light B in operation.

Figure 2:
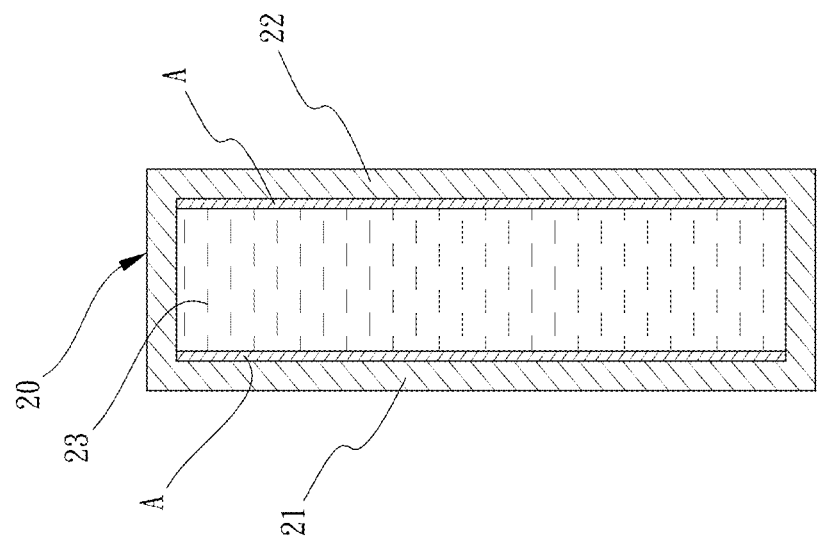
FIG. 2 is a schematic cross-sectional view taken along II-II of FIG. 1.
Figure 2:
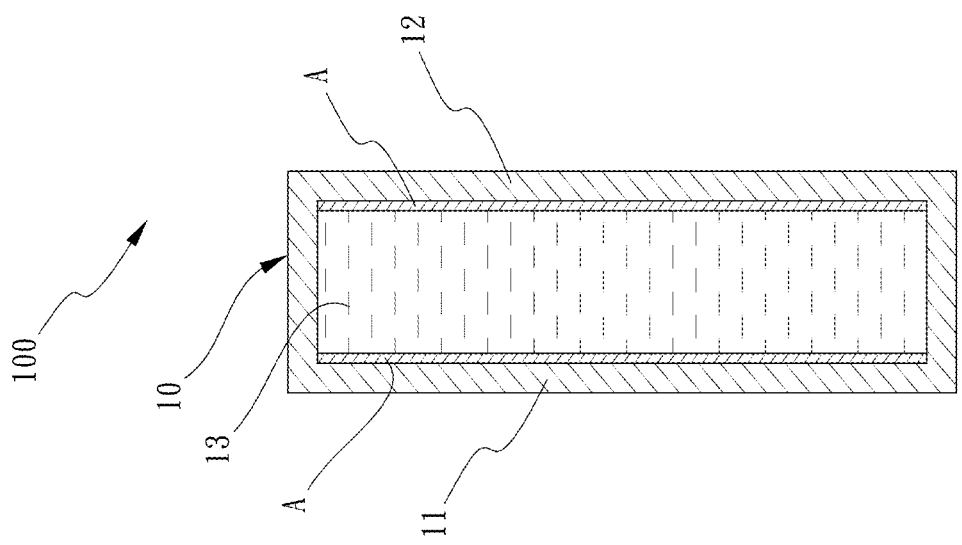

The features of the components of the present invention will be described in detail in the following paragraphs. As shown in FIGS. 1 to 8, each of the first upper substrate 11, the first lower substrate 12, the second upper substrate 21 and the second lower substrate 22 is a transparent film structure having an inner side coated with transparent conductive film A, as shown in FIG. 2, so that the same voltage can be applied on the transparent liquid crystal layer 13 of the first liquid crystal cell 10 and the transparent liquid crystal layer 23 of the second liquid crystal cell 20 to change the birefringence of the transparent liquid crystal layers 13 and 23, so that after the incident light B travels through the first liquid crystal cell 10 and the second liquid crystal cell 20, the outgoing light C has a change on linear polarization direction.

Secondly, each of the transparent liquid crystal layers 13 and 23 is positive nematic liquid crystal.

Figure 9:
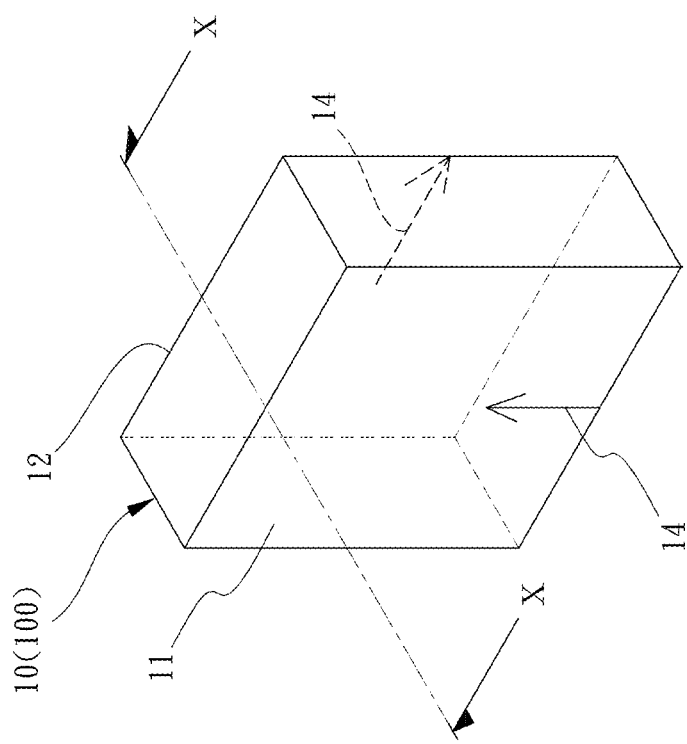
FIG. 9 is a perspective view of a second embodiment of the present invention.
Figure 10:
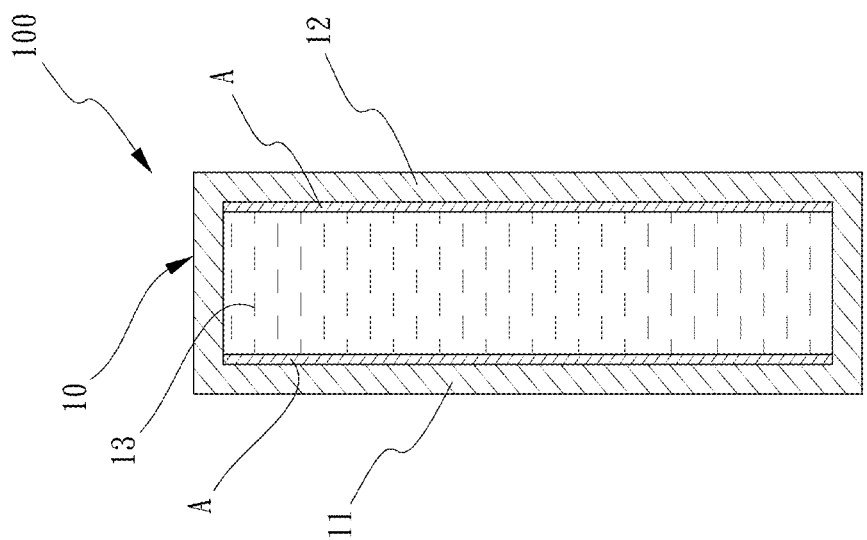
FIG. 10 is a schematic cross-sectional view taken along X-X of FIG. 9.
Figure 11:
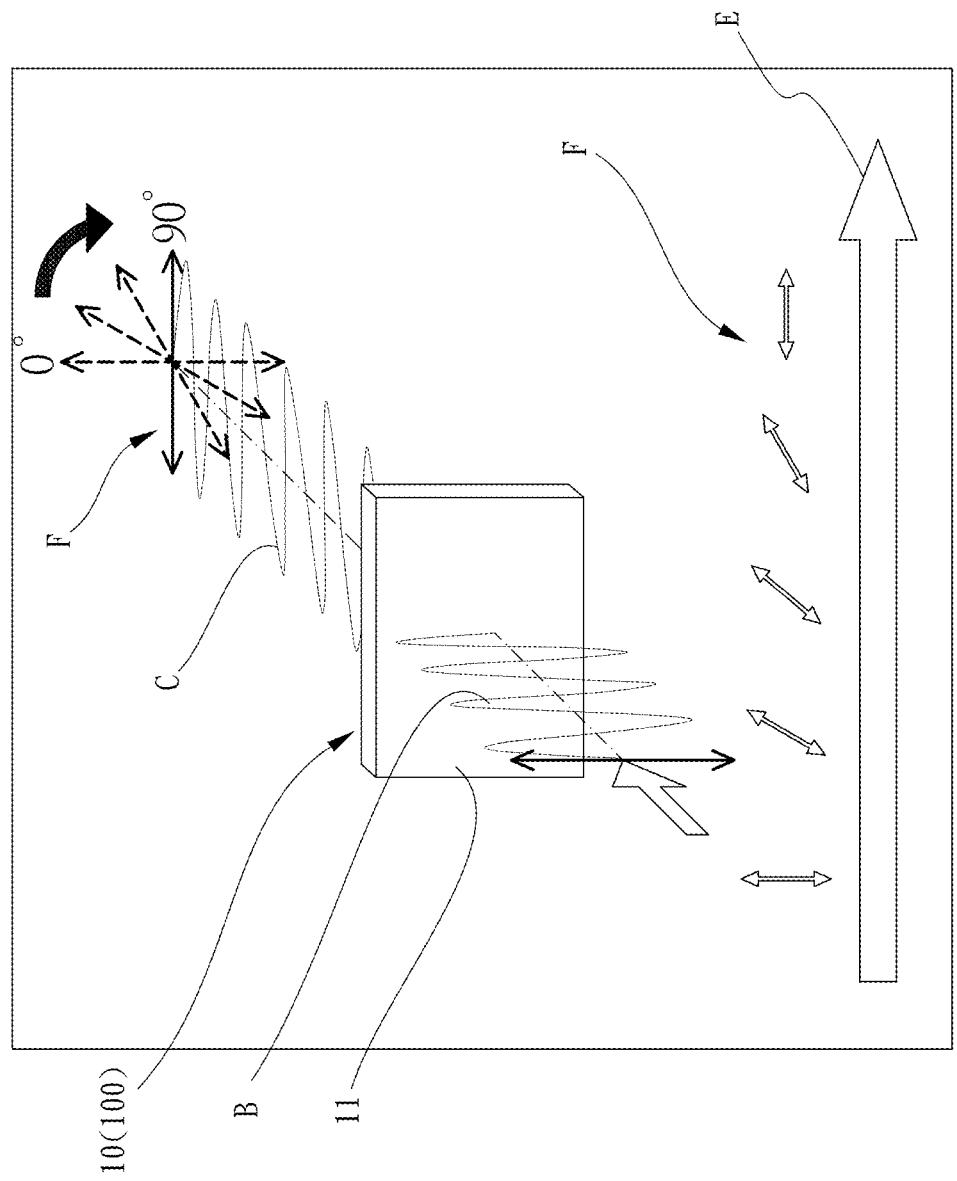
FIG. 11 is a schematic view of an operation of a second embodiment of a continuously electronically controlled linear polarization rotator, according to the present invention.

Furthermore, the first liquid crystal cell 10 and the second liquid crystal cell 20 are applied by the same voltages, and the applied voltage is perpendicular to the surface orientation of each of the first upper substrate 11, the first lower substrate 12, the second upper substrate 21 and the second lower substrate 22. As a result, continuously changing the applied voltage can make the outgoing light C traveling through the first liquid crystal cell 10 and the second liquid crystal cell 20 have a continuous change in the linear polarization angle from 180° to 0°.

please refer to FIGS. 9 to 11, which shows a second embodiment of the continuously electronically controlled linear polarization rotator of the present invention. As shown in FIGS. 9 to 11, the second embodiment of the rotator 100 includes a first liquid crystal cell 10.

The first liquid crystal cell 10 includes a first upper substrate 11 and a first lower substrate 12 which are treated to have horizontal alignment directions perpendicular orthogonal to each other, that is, the alignment directions 14 of the first upper substrate 11 and the first lower substrate 12 are perpendicular to each other. The first liquid crystal cell 10 is filled with a transparent liquid crystal layer 13 located between the first upper substrate 11 and the first lower substrate 12.

The first liquid crystal cell 10 satisfies the condition that dΔn/λ is in a range of 1.2 to 1.8, wherein λ is a wavelength of incident light B traveling through the first liquid crystal cell 10, d is a thickness of the transparent liquid crystal layer 13, Δn is a birefringence of the transparent liquid crystal layer 13, a voltage can be applied on the first liquid crystal cell 10 to change the linear polarization direction of the outgoing light C traveling through the first liquid crystal cell 10.

Please refer to FIG. 11, which is a schematic view of an operation of the second embodiment of the continuously electronically controlled linear polarization rotator, according to the present invention. As shown in FIG. 11, when the included angle between the polarization direction of the incident light B and the alignment direction of the first upper substrate 11 of the first liquid crystal cell 10 is set as 0° or 90°, the outgoing light C traveling through the first liquid crystal cell 10 is magnified along the arrow direction in FIG. 11 in response to the change in the voltage E (above a certain voltage value) applied on the first liquid crystal cell 10, so that the linear polarization rotation angle F of the outgoing light C is continuously changed from 0° to 90°. Therefore, the second embodiment of the present invention is operated under a limitation that the included angle between the polarization direction of the incident light B and the alignment direction of the first upper substrate 11 of the first liquid crystal cell 10 is set as 0° or 90°, but the linear polarization angle of the outgoing light C can be continuously changed from 0° to 90°; compared to the conventional electronically controlled twisted nematic liquid crystal which only switch the linear polarization rotation angle of outgoing light, between two statuses on/off with no continuity, the present invention has non-obviousness.

According to the first embodiment of the present invention, the rotator 100 includes the first liquid crystal cell 10 and the second liquid crystal cell 20, the first lower substrate 12 is arranged correspondingly to the second upper substrate 21 of the second liquid crystal cell 20, and the alignment direction 14 of the first lower substrate 12 of the first liquid crystal cell 10 is perpendicularly orthogonal to the second alignment direction 24 of the second upper substrate 21 of the second liquid crystal cell 20; when the first liquid crystal cell and the second liquid crystal cell are applied by voltage, the linear polarization angle of the incident light C traveling through the first liquid crystal cell 10 and the second liquid crystal cell 20 can be continuously changed from 0° to 180°; in the operation of the rotator 100, the linear polarization direction of the incident light B can be any direction, that is, the linear polarization direction of the incident light B is not limited, so it does not need to consider the linear polarization direction of the incident light B in the operation of the rotator 100.

The features of components of the second embodiment of the rotator 100 of the present invention will be described in detail. Please refer FIGS. 9 to 11, each of the first upper substrate 11 and the first lower substrate 12 is a transparent film structure having an inner side coated with a transparent conductive film A.

The transparent liquid crystal layer 13 is positive nematic liquid crystal.

A voltage can be applied on the first liquid crystal cell 10, and the applied voltage is perpendicular to a surface orientation of each of the first upper substrate 11 and first lower substrate 12, to make the linear polarization rotation angle of the outgoing light C have a continuous change in a range of 0° to 90°, but the included angle between the polarization direction of the incident light B and the alignment direction of the first upper substrate of the first liquid crystal cell is limited as 0° or 90°.

As described above, the present invention uses, the alignment direction of the first lower substrate 12 of the first liquid crystal cell 10 is arranged perpendicularly orthogonal to the alignment direction of the second upper substrate 21 of the second liquid crystal cell 20, and the first liquid crystal cell 10 and the second liquid crystal cell 20 satisfy the condition that $d\Delta n/\lambda$ is in a range of 1.2 to 1.8, so as to solve the conventional problem that the conventional electronically controlled twisted nematic liquid crystal only can switch the polarization rotation angle of outgoing light between two statuses on/off and is unable to continuously change. Therefore, the present invention can have the following advantages.

First, the same voltages with continuous change can be applied on the first liquid crystal cell 10 and the second liquid crystal cell 20, to make the linear polarization angle of the outgoing light C traveling through the first liquid crystal cell 10 and the second liquid crystal cell 20 continuously change from 0° to 180°.

Secondly, the low-voltage operation of the present invention can be integrated with the TFT in use, and it does not need to consider the linear polarization direction of the incident light B in operation of the present invention.

The present invention disclosed herein has been described by means of specific embodiments. However, numerous modifications, variations and enhancements can be made thereto by those skilled in the art without departing from the spirit and scope of the disclosure set forth in the claims.

What is claimed is:

1. A continuously electronically controlled linear polarization rotator, comprising:
    a first liquid crystal cell, comprising a first upper substrate and a first lower substrate which are treated to have horizontal alignment directions perpendicular orthogonal to each other, and the first liquid crystal cell is filled with a transparent liquid crystal layer located between the first upper substrate and the first lower substrate;
    a second liquid crystal cell, comprising a second upper substrate and a second lower substrate, wherein horizontal alignment directions of the second upper substrate and the second lower substrate are perpendicular orthogonal to each other, and the second liquid crystal cell is filled with a transparent liquid crystal layer located between the second upper substrate and the second lower substrate;
    wherein the first liquid crystal cell and the second liquid crystal cell satisfy a condition that $d\Delta n/k$ is in a range of 1.2 to 1.8, wherein $\lambda$ is wavelength of incident light traveling through the first liquid crystal cell and the second liquid crystal cell, d is a thickness of the transparent liquid crystal layer, $\Delta n$ is birefringence of the transparent liquid crystal layer, the first lower substrate of the first liquid crystal cell is contacted and abutted correspondingly to the second upper substrate of the second liquid crystal cell, and an alignment direction of the first lower substrate of the first liquid crystal cell is perpendicular orthogonal to a second alignment direction of the second upper substrate of the second liquid crystal cell, wherein the first liquid crystal cell and the second liquid crystal cell are applied by voltages, when the voltages applied to the first liquid crystal cell and the second liquid crystal cell continuously change, a linear polarization rotation angle of outgoing light traveling through the first liquid crystal cell and the second liquid crystal cell has a continuous change from 0° to 180°.

2. The continuously electronically controlled linear polarization rotator according to claim 1, wherein each of the first upper substrate, the first lower substrate, the second upper substrate, the second lower substrate is a transparent film structure having an inner side coated with a transparent conductive film.

3. The continuously electronically controlled linear polarization rotator according to claim 1, wherein the transparent liquid crystal layer is positive nematic liquid crystal.

\* \* \* \* \*